United States Patent
Baldovino et al.

(10) Patent No.: US 8,568,260 B2
(45) Date of Patent: Oct. 29, 2013

(54) TOOTHED BELT FOR USE WITH OIL AND RELATIVE TIMING CONTROL SYSTEM

(75) Inventors: Carlo Baldovino, Montesilvano (IT); Marco Di Meco, Pescara (IT); Tommaso Di Giacomo, San Martino Sulla Marrucina (IT); Marino Petaccia, Lettomanoppello (IT)

(73) Assignee: Dayco Europe S.r.l., Chieti (IT)

( * ) Notice: Subject to any disclaimer, the term of this patent is extended or adjusted under 35 U.S.C. 154(b) by 0 days.

(21) Appl. No.: 10/590,227

(22) PCT Filed: Sep. 29, 2004

(86) PCT No.: PCT/IT2004/000533
§ 371 (c)(1), (2), (4) Date: May 14, 2007

(87) PCT Pub. No.: WO2005/080820
PCT Pub. Date: Sep. 1, 2005

(65) Prior Publication Data
US 2007/0281814 A1 Dec. 6, 2007

(30) Foreign Application Priority Data
Feb. 23, 2004 (WO) .................. PCT/IT2004/000081

(51) Int. Cl.
*F16G 1/10* (2006.01)

(52) U.S. Cl.
USPC ........................... 474/205; 474/260; 474/271

(58) Field of Classification Search
USPC .................................. 474/204–205, 260–263
See application file for complete search history.

(56) References Cited

U.S. PATENT DOCUMENTS

| 4,099,422 A | * | 7/1978 | Cicognani et al. | 474/205 |
| 4,498,891 A | * | 2/1985 | Mashimo et al. | 474/205 |

(Continued)

FOREIGN PATENT DOCUMENTS

| CA | 2474651 A1 | 10/2003 |
| EP | 0549401 | 6/1993 |

(Continued)

OTHER PUBLICATIONS

Therban Hydrogenated Nitirle Rubber (HNBR) for High Quality Heat and Oil Resistant Seals and Gaskets Technical Information Bulletin, 2000 Bayer Corporation.*

(Continued)

*Primary Examiner* — Anna Momper
(74) *Attorney, Agent, or Firm* — Frommer Lawrence & Haug LLP; Ronald R. Santucci

(57) ABSTRACT

Toothed belt for use with oil comprising a body and a plurality of teeth extending from at least a surface of the body; the teeth are covered by a coating fabric. The toothed belt comprises a plurality of resistant inserts produced from at least a first and a second material. Preferably, the resistant inserts are constituted by glass fibers and carbon fibers. Preferably, a resistant layer is made to adhere over the coating fabric, said layer comprising a fluorine based plastomer with the addition of an elastomeric material, wherein the plastomer is present in a greater amount than the elastomeric material. The elastomeric material forming the body of the belt is preferably a copolymer obtained from a diene monomer and a monomer containing nitrile groups, wherein the nitrile groups are between 33% and 49%, preferably 39 weight % with respect to the copolymer.

76 Claims, 5 Drawing Sheets

(56) References Cited

U.S. PATENT DOCUMENTS

| | | | |
|---|---|---|---|
| 5,306,213 A * | 4/1994 | Nakajima et al. | 474/205 |
| 5,967,922 A | 10/1999 | Ullein et al. | |
| 6,419,775 B1 | 7/2002 | MacKintosh | |
| 6,945,891 B2 * | 9/2005 | Knutson | 474/260 |
| 7,056,249 B1 * | 6/2006 | Osako et al. | 474/260 |
| 7,396,884 B2 * | 7/2008 | Achten | 525/387 |
| 7,682,274 B2 * | 3/2010 | Akiyama et al. | 474/260 |
| 2002/0015825 A1 | 2/2002 | Meco et al. | |
| 2002/0098935 A1 * | 7/2002 | Danhauer et al. | 474/261 |
| 2002/0142147 A1 | 10/2002 | Sogabe et al. | |
| 2004/0033857 A1 * | 2/2004 | Welk et al. | 474/263 |
| 2004/0127316 A1 * | 7/2004 | Hashimoto et al. | 474/109 |
| 2004/0226641 A1 * | 11/2004 | Akiyama et al. | 152/451 |
| 2007/0240658 A1 | 10/2007 | Baldovino et al. | |

FOREIGN PATENT DOCUMENTS

| | | |
|---|---|---|
| EP | 1 157 813 A1 | 11/2001 |
| JP | 02248741 A * | 10/1990 |
| WO | WO 01/18291 A1 | 3/2001 |
| WO | WO 02/084144 A1 | 10/2002 |
| WO | WO 03/023254 A2 | 3/2003 |

OTHER PUBLICATIONS

Anonymous, "Acrobat Reader Document properties Summary Screenshot", XP-002301510, published on Oct. 19, 2004.

Bayer, "Therban—Comparative Properties", XP-002301499, published on Nov. 23, 2003; http:/www.therban.com/intertherban/c1multimedia_en.nsf/SysAllByCMSInternalKey/CHAR-5E3CG9/$File/compa_prop.pdf?OpenElement, retrieved on Oct. 19, 2004.

* cited by examiner

TOOTHED BELT FOR USE WITH OIL AND RELATIVE TIMING CONTROL SYSTEM

TECHNICAL FIELD

The present invention relates to a toothed belt and, in particular, a toothed belt for use with oil and to the relative timing control system.

BACKGROUND ART

Toothed belts generally comprise a body of elastomeric material, embedded in which are a plurality of longitudinal filiform resistant inserts, also called "cords", and a plurality of teeth covered by a coating fabric.

Each component of the belt contributes towards increasing the performances in terms of mechanical resistance, to decrease the risk of breakage of the belt and increase the specific transmissible power.

The coating fabric of the belts increases the abrasion resistance and hence protects the working surface of the belt from wear which is due to rubbing between the sides and the slopes of the teeth of the belt and the sides and the bottoms of the grooves of the pulley with which the belt interacts. Moreover, the coating fabric decreases the coefficient of friction on the working surface, reduces deformability of the teeth and above all reinforces the root of the tooth, thereby preventing breakage.

The coating fabric used may be constituted by a single layer or, alternatively, may be a double layer to guarantee increased toughness and rigidity. The coating fabric is normally treated with an adhesive, for example RFL (resorcinol-formaldehyde latex) to increase adherence between the body and the fabric.

Currently, many drive systems use gears or chains rather than toothed belts. However, both gears and chains are complex systems to produce. Moreover, both chains and gears produce more noise and function exclusively with oil lubrication. Furthermore, during operation the chains are subject to increased elongation and therefore replacement with a belt would allow greater precision of the drive.

In addition to these main disadvantages, both the control system with chains and the one with gears are very costly.

For these reasons it would therefore be desirable to be able to replace the chains and gears with toothed belts without having to make any adjustments to the drive system as a whole and therefore in these cases the toothed belt would necessarily have to function with oil or even partly immersed in oil.

Numerous studies have been carried out on toothed belts to verify whether they are capable of operating in direct contact with oil. For example, the U.S. Pat. No. 4,099,422 relates to a toothed belt suitable for use in oil bath and comprising a body in elastomeric material, preferably epichlorohydrin, and a double fabric coating the teeth.

The patent application EP0549401 relates to a toothed belt comprising a body formed of a first layer made of CSM or ACSM and a second layer on the side of the teeth formed of an HNBR matrix covered by a fabric treated with HNBR.

However, none of the prior art toothed belts have a high resistance to wear and generally operation in direct contact with oil facilitates breakage of the belt which therefore has a reduced average life.

Therefore, no toothed belt to be used with oil or partly immersed in oil is capable of withstanding the duration tests established for use in vehicle drive systems.

Replacement of chains and gears in existing systems and, therefore, with the overall dimensions already defined, would make it preferable to use toothed belts having a narrower width with respect to the width of the belts normally used in systems not in direct contact with oil.

Due to the limited extension in width of the belt to be used, it would be more probable for malfunction caused by the overall decrease in modulus, for example poor meshing, to occur.

A possible solution could be the use of a material with a much higher modulus than the one used in the toothed belts currently on the market, to form the resistant inserts of the belts, which define the modulus of the belts almost entirely. For example, resistant inserts made entirely of carbon fibre could be used.

However, this alternative solution causes problems of adhesion between the material forming the resistant insert and the mixture of the body and, moreover, materials with a high modulus generally have a much higher cost than the glass resistant inserts currently used.

DISCLOSURE OF INVENTION

The object of the present invention is therefore to obtain a toothed belt which can be used with oil or even partly immersed in oil without decrease in the performances of said belt and maintaining the necessary mechanical properties of adhesion, resistance to wear, precision of meshing and noise emission.

A further object of the present invention is to allow chains and gears to be replaced without variations in the dimensions of the control system and therefore to use toothed belts of limited width.

According to the present invention this object is obtained by a toothed belt as claimed in claim 1.

According to the present invention, a timing control system as claimed in claim 25 is also provided.

BRIEF DESCRIPTION OF THE DRAWINGS

For better understanding of the present invention, it is described also with reference to the accompanying figures, wherein.

BEST MODE FOR CARRYING OUT THE INVENTION

Figure 1:
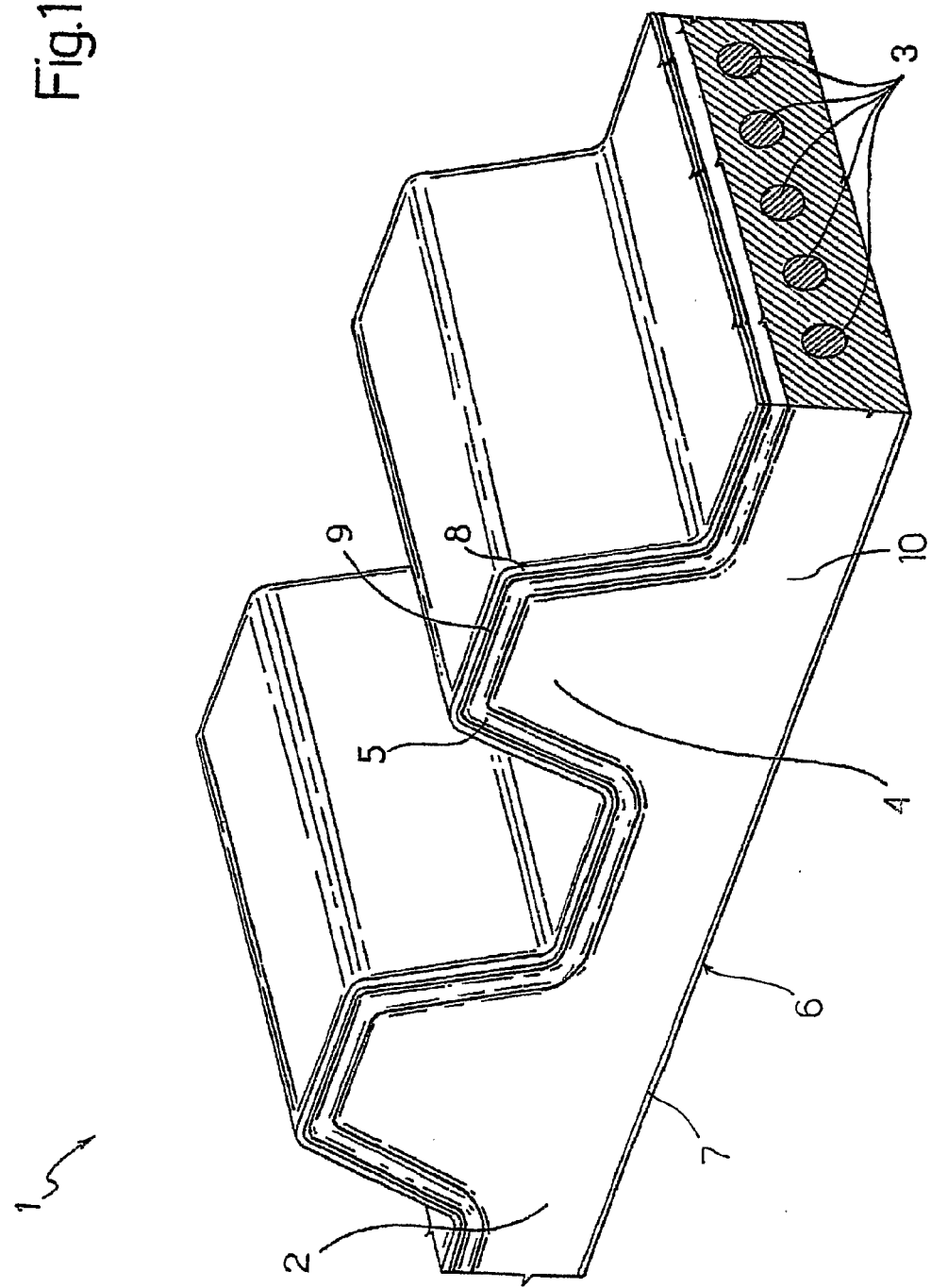
FIG. 1 shows a perspective and partial view of a toothed belt according to the invention.

In FIG. 1 a toothed belt is indicated as a whole with the number 1. The belt 1 comprises a body 2 made of elastomeric material, embedded in which are a plurality of longitudinal filiform resistant inserts 3. The body 2 has a first face provided with toothing 4, which is covered in a coating fabric 5, and a second side or back 6 of the belt. Preferably, the back 6 is also covered in a fabric 7.

Even more preferably, the fabric 5 which coats the toothing 4 is the same as the fabric 7 which coats the back 6.

Preferably, the body 2 comprises as main elastomer, that is, present for more than 50 weight % with respect to the other elastomers used in the mixture, a copolymer formed from a monomer containing nitrile groups and from a diene.

More preferably the copolymer used is hydrogenated acrylonitrile butadiene.

Preferably, the copolymer used is obtained from monomers containing nitrile groups in a percentage between 33 and 49 weight % with respect to the final copolymer.

Even more preferably, the copolymer used is obtained from monomers containing nitrile groups in a percentage of 39 weight % with respect to the final copolymer, for example it is possible to use a mixture constituted by 50% of THERBAN 3446 (Bayer registered trademark) and by 50% of THERBAN 4307 (Bayer registered trademark).

Advantageously the mixture of elastomeric material also comprises fibres, preferably in a weight percentage between 0.5% and 15% with respect to the elastomeric material and preferably having a length between 0.1 and 10 mm.

The use of fibres allows adequate mechanical properties of the body mixture to be maintained.

The mixture of elastomeric material may contain, in addition to the main elastomer, also other elastomers, and also conventional additives, such as reinforcing agents, fillers, pigments, stearic acid, accelerators, vulcanizing agents, antioxidants, activators, initiators, plasticizers, waxes, pre-vulcanizing inhibitors, and the like.

For example, as filler carbon black or white filler may be used, which may generally be added in amounts between 5 and 200 phr, preferably approximately 70 phr. Talcum, calcium carbonate, silica and the like may also be added in an amount generally between 5 and 150 phr, or dispersions in oil containing fillers. Organosilanes may be used in amounts between 0.1 and 20 phr. Sulfur-donor vulcanizing agents may be used, such as amino disulfides and polymeric polysulfides, free sulfur, or organic or non-organic peroxides. The amount added varies according to the type of rubber and the type of vulcanizing agent used, and is generally between 0.1 and 10 phr. Among the anti-degrading agents most widely used in the composition of the mixture are microcrystalline waxes, paraffin waxes, monophenols, bisphenols, thiophenols, polyphenols, derivatives of hydroquinone, phosphites, mixtures of phosphates, thioesters, naphtylamines, diphenol amines, derivatives of substituted or non-substituted diaryl amines, diaryl-phenylenediamines, para-phenylenediamines, quinolines, and amine mixtures. The anti-degrading agents are generally used in an amount between 0.1 and 10 phr. Examples of process oils that may be used are dithiobisbenzanilide, poly para-dinitrosobenzene, xylyl mercaptans, polyethylene glycol, petroleum oils, vulcanized vegetable oils, phenol resins, synthetic oils, petroleum resins, and polymeric esters. The process oils may be used in a conventional amount between 0 and 140 phr. Amongst the initiators, stearic acid is conventionally used in an amount between 1 and 4 phr. Conventional additives may moreover be added, such as calcium oxide, zinc oxide, and magnesium oxide, generally in an amount between 0.1 and 25 phr. Conventional accelerators or combinations of accelerators are also used, such as amines, disulfides, guanidine, thiourea, thioazoles, thiols, sulphenamides, dithiocarbamates, and xanthates, generally in an amount between 0.1 and 100 phr.

The fabric 5 coating the toothing 4 or the fabric 7 coating the back 6 can be constituted by one or more layers and can, for example, be obtained by means of the weaving technique known as 2×2 twill.

The fabrics 5, 7 are preferably constituted by a polymeric material, preferably aliphatic or aromatic polyamide, even more preferably by high thermal resistance and high tenacity polyamide 6/6.

The fabrics 5, 7 can advantageously be of the type wherein each weft thread is constituted by an elastic thread as core and by at least one composite thread wound on the elastic thread, where the composite thread comprises a thread with high thermal and mechanical resistance and at least one coating thread wound on the thread with high thermal and mechanical resistance.

A toothed belt 1 according to the present invention comprises a resistant layer 8 disposed externally to the fabric 5. Preferably, an adhesive 9 is also interposed between the fabric 5 and the resistant layer 8.

The resistant layer 8 is constituted by a fluorinated plastomer with the addition of an elastomeric material, the fluorinated plastomer being present in an amount greater in weight with respect to the elastomeric material.

An example of resistant layer usable is for example described in the patent EP1157813 to the same applicant.

According to the present invention, the fluorinated plastomer is preferably a compound based on polytetrafluoroethylene. Preferably, the elastomeric material with which the fluorinated plastomer is mixed to form the resistant layer 8 is HNBR, even more preferably HNBR modified with a zinc salt of polymethacrylic acid, for example ZEOFORTE ZSC (Nippon Zeon registered trademark).

Preferably, to ensure the necessary resistance the resistant layer 8 has a weight between 150 and 400 g/m$^2$, equivalent to a average thickness between 0.050 and 1 mm.

Preferably, the fluorinated plastomer is present in amounts between 101 and 150 in weight per 100 parts of elastomeric material.

The resistant layer 8 also comprises a peroxide as vulcanizing agent. The peroxide is normally added in amounts between 1 and 15 parts in weight with respect to 100 parts of elastomeric material.

The use as mixture constituting the body of the belt of an elastomeric material based on a copolymer formed from a diene and from a monomer containing nitrile groups in a percentage between 33 and 49 weight % with respect to the final copolymer, in combination with the use of a resistant layer 8 over the layer of fabric 5 coating the toothing 4 produced as described above, makes it possible to prevent a decrease in the mechanical properties, decreased adhesion, poorer meshing and decreased resistance to wear.

Preferably, the resistant layer 8 is also disposed over the fabric 7 coating the back 6, when said fabric 7 is present. In this case the resistant layer 8 makes it possible to prevent oil from penetrating also on the side of the back 6 of the toothed belt 1 and is particularly advantageous when the toothed belt 1 is used in control systems wherein the back 6 of the belt is with pads or tensioners. In fact, in these systems, the oil remains interposed between the contact surface of the pad or tensioner with the belt and the back of said belt and therefore penetration inside the mixture forming the body would be encouraged.

Preferably the toothed belt 1 can be treated on all the external surfaces and, in particular, on the sides 10 where the body mixture is more exposed to the attack of oil, with a rubber resistant to swelling, for example ENDURLAST (Lord registered trademark).

According to the present invention, the resistant inserts 3 are of the "hybrid" type, that is, they are produced in at least a first and a second material.

In fact, it has surprisingly been discovered that by using resistant inserts 3 formed of two different materials to produce toothed belts operating with oil, it is possible to solve the drawbacks of prior art belts described above. In particular, it has been found that in this way it is possible to produce narrower toothed belts, which can be used in a timing control system without any dimensional variations being made.

Moreover, the use of resistant inserts 3 produced in two different materials allows greater adhesion of the resistant insert 3 to the mixture constituting the body of the belt 1 and reduces the decline in tensile strength in fatigue tests when oil is present.

The resistant inserts 3 are preferably treated with a resorcinol-formaldehyde latex based composition, known as RFL, and in particular with an RFL composition suitable to prevent oil absorption. Preferably, the RFL used comprises a latex formed from a monomer containing nitrile groups and from a diene, for example HNBR or hydrogenated butadiene acrylonitrile. Even more preferably, the latex is obtained from monomers containing nitrile groups in a weight percentage with respect to the final copolymer similar to the preferred elastomeric material used to form the body of the toothed belt 1 described previously.

Therefore, the latex is preferably based on a copolymer formed from a diene and from a monomer containing nitrile groups in a percentage between 33 and 49 weight % with respect to the final copolymer, even more preferably based on a copolymer formed from a diene and from a monomer containing nitrile groups in a percentage of 39 weight % with respect to the final copolymer.

It has been found experimentally that the use of resistant inserts 3 produced in several materials, when treated with an RFL comprising a material suitable to resist oil, contributes towards overcoming the problems at the basis of the present invention.

Both the first and the second material used to produce the resistant inserts 3 according to the present invention are preferably chosen in the group constituted by glass fibres, aramid fibres, polyester fibres, carbon fibres and PBO fibres. The first material preferably has a lower modulus than the second material and is preferably wound around the second material. The first material is therefore chosen to solve problems of compatibility with the mixture of the surrounding body and the second material is therefore chosen to obtain a higher modulus in the toothed belt.

Preferably, in section the second material occupies a surface between 15 and 75% with respect to the total surface of the section. Even more preferably, the second material occupies a surface between 45 and 55% with respect to the total surface. The first material is preferably glass fibre, the second material is preferably carbon fibre. Even more preferably, the glass fibres are high modulus fibres.

Preferably, the glass fibres are wound around the carbon fibres to cover the carbon fibres externally at least partially and even more preferably to cover the carbon fibres entirely.

Preferably the inserts according to the present invention have a twist of the "Lang's twist" type, that is, they have two twists in the same direction, as this construction has proven to be particularly effective.

It is possible to vary the number of fins forming a resistant insert, just as the number of base filaments, the titre or the entire construction of the insert without departing from the present invention.

The toothed belt 1 is vulcanized according to common and known methods which are consequently not described in detail.

Figure 5:
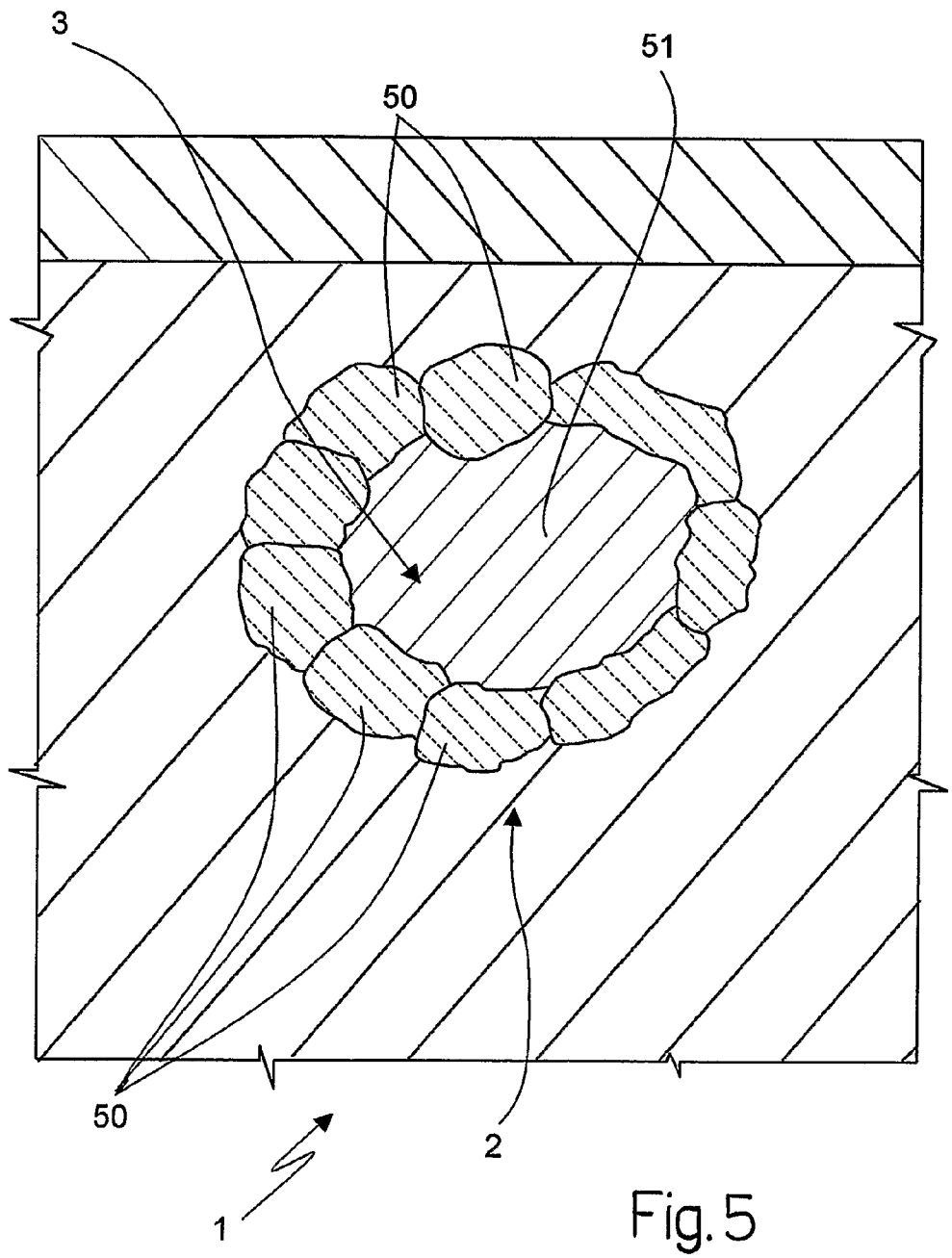
FIG. 5 shows a schematic and enlarged section of a reinforcing insert for a toothed belt according to the present invention.

A purely indicative example of a resistant insert 3 produced according to the present invention is described below and shown in FIG. 5, where the number 50 indicates 9 twisted yarns in a first material which entirely surround 1 twisted yarn, indicated with the number 51 and produced in a second material. The first material is glass fibre, the second material is carbon fibre. The glass fibres are wound around the carbon fibres to cover the carbon fibres entirely.

To form this resistant insert 3 glass fins are treated with a treatment based on an adhesive composition, for example RFL, and then twisted a first time to form a twisted yarn. Subsequently, a certain number of these twisted yarns are wound around a carbon fibre twisted yarn. FIG. 5 exemplifies the case in which the twisted yarns are 9.

In this way the twisted yarns form an insert with dimensions between 0.7 and 1.4 mm, in particular 1.15 mm if the construction is 34 tex 3*9, 400 tex*1.

The first torsion to which the fins are subjected to form the twisted yarns consists in a number of torsions equal to 80 in a first direction S (clockwise).

The second torsions to which the twisted yarns are subjected in winding around the carbon are again 80 and are performed in the same direction S to form resistant inserts "S".

These resistant inserts therefore have a twist of the Lang's twist type, that is, they have two twists in the same direction.

The torsions to which the carbon fibre fins are subjected to form a twisted yarn are 40 and these are also in the same first direction S.

By means of the same procedure and with the same construction resistant inserts 3 are also formed which are twisted both times in a direction opposite to the first direction, that is, in the direction Z (counter-clockwise) to form resistant inserts "Z".

To form a toothed belt according to the present invention, the resistant inserts S and Z are then simultaneously deposited on the mould with a spiralling pitch between, for example, 2.6 and 3.2 mm and preferably 2.9.

In general, prior art toothed belts have resistant inserts made of high modulus glass which have modulus values at the most of 28 N/mm, where the modulus is defined as the force required to elongate by one millimeter a belt having a length of 1000 mm and a width of one millimeter.

Advantageously, a belt comprising resistant inserts 3 according to the present invention has modulus values of over 28 N/mm, even more preferably between 28 and 50 N/mm; for example, with the construction of the resistant insert previously described a modulus value of 42 N/mm was obtained for the toothed belt.

Figure 2:
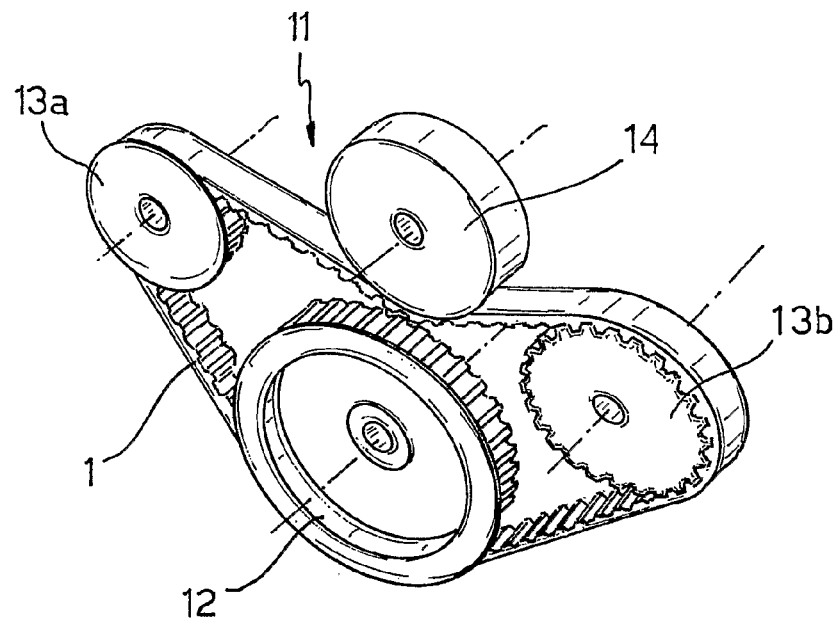
FIG. 2 shows a diagram of a first timing control system using a first toothed belt according to the present invention.

The belt 1 according to the present invention can be used, for example, in a timing control system for a motor vehicle of the type shown in FIG. 2. The timing control system is indicated in the figure as a whole with the number 11 and comprises a driving pulley 12 fixed rigidly to the drive shaft, not shown, a first 13a and a second 13b driven pulley and a tensioner 14 to tension the toothed belt.

Figure 3:
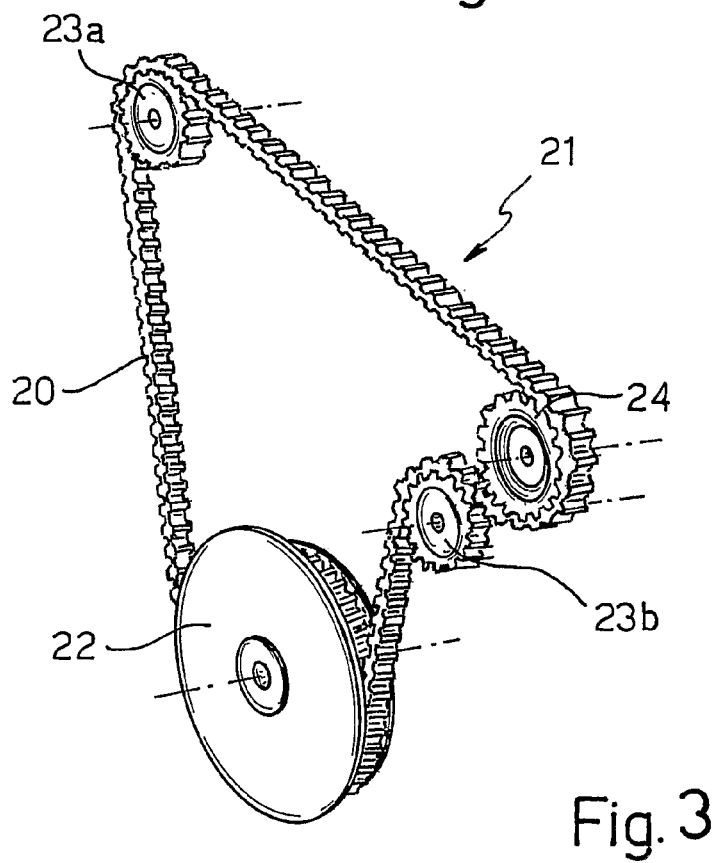
FIG. 3 shows a diagram of a second timing control system using a second toothed belt according to the present invention.

According to a second alternative embodiment, shown in FIG. 3, a toothed belt according to the invention is indicated with the number 20, with a toothing on both faces and therefore having a resistant fabric that covers both toothings.

A toothed belt 20 can, for example, be used in a timing control system for a motor vehicle of the type shown in FIG. 3. The timing control system is indicated in the figure as a whole with the number 21 and comprises a driving pulley 22, fixed rigidly to the drive shaft, not shown, a first 23a, a second 23b and a third 24 driven pulley.

Figure 4:
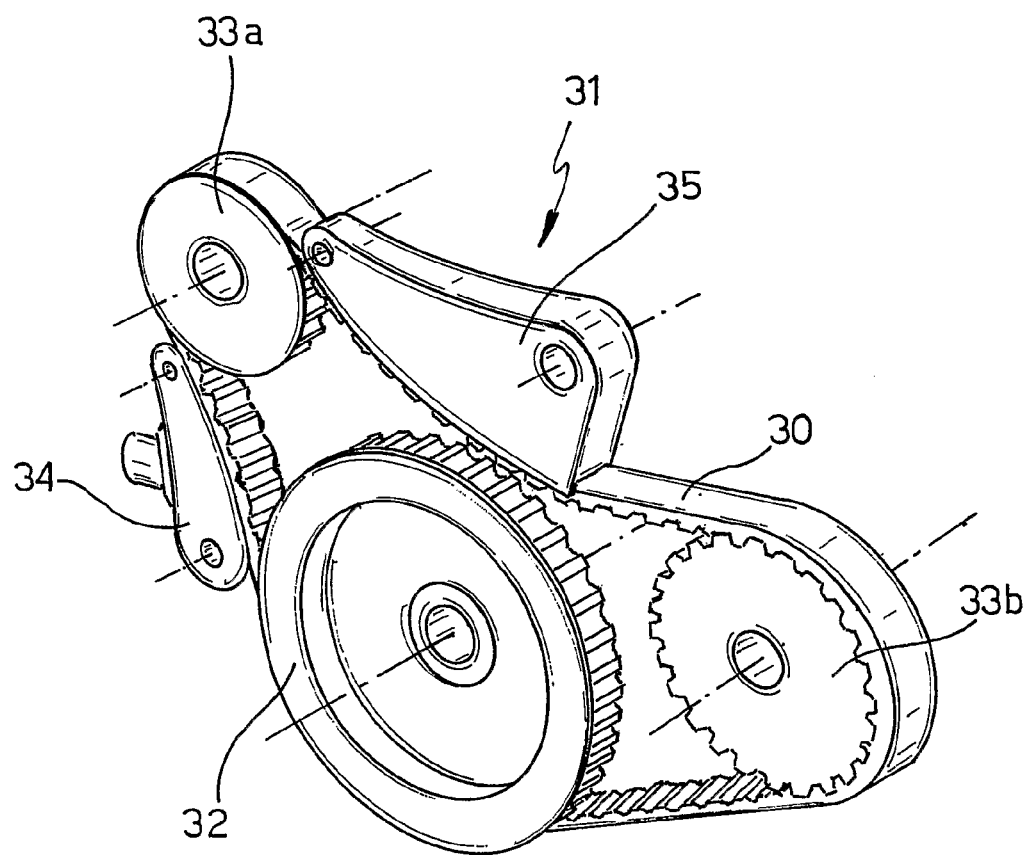
FIG. 4 shows a diagram of a third timing control system using a third toothed belt according to the present invention.

According to a third embodiment of the present invention, shown in FIG. 4, a toothed belt 30 according to the present invention can advantageously be used in a timing control system indicated in the figure as a whole with the number 31, which comprises a driving pulley 32, fixed rigidly to the drive shaft, not shown, a first 33a and a second 33b driven pulley, a pad tensioner 34 and a pad 35.

In use, the toothed belts 1, 20 and 30 in the respective control systems 11, 21 and 31 are in direct contact with oil. FIGS. 2 to 4 refer to control systems relative to movement of the balancing countershafts, but it is clear that the toothed belt according to the present invention may also be used in "cam to cam" systems or for movement of the oil pump. In these cases during operation the belt is partly immersed in an oil bath.

Moreover, it is also possible to use the belt of the present invention in the main drive for movement of the cams and also for movement of the injection pump in diesel engines.

In particular, the belt according to the invention has been subjected to duration tests with oil. To perform these tests it was used on control systems comprising a driving pulley, a driven pulley and a tensioner in which oil is sprayed directly onto the belt by means of a pipe.

The conditions in which the test was performed are indicated in Table 1.

TABLE 1

| | |
|---|---|
| Belt type | Dayco 122RPP+150 |
| Speed | 6000 rpm |
| Specific load | 40 N/mm |
| Oil temperature | 140° C. |
| Oil quantity | 22 l/h |
| Number of teeth driving pulley | 22 |
| Number of teeth driven pulley | 44 |
| Tensioner diameter | 47 mm |

The toothed belts tested and formed according to the example previously described resisted in these conditions for at least 80,000,000 cycles.

Figure 6:
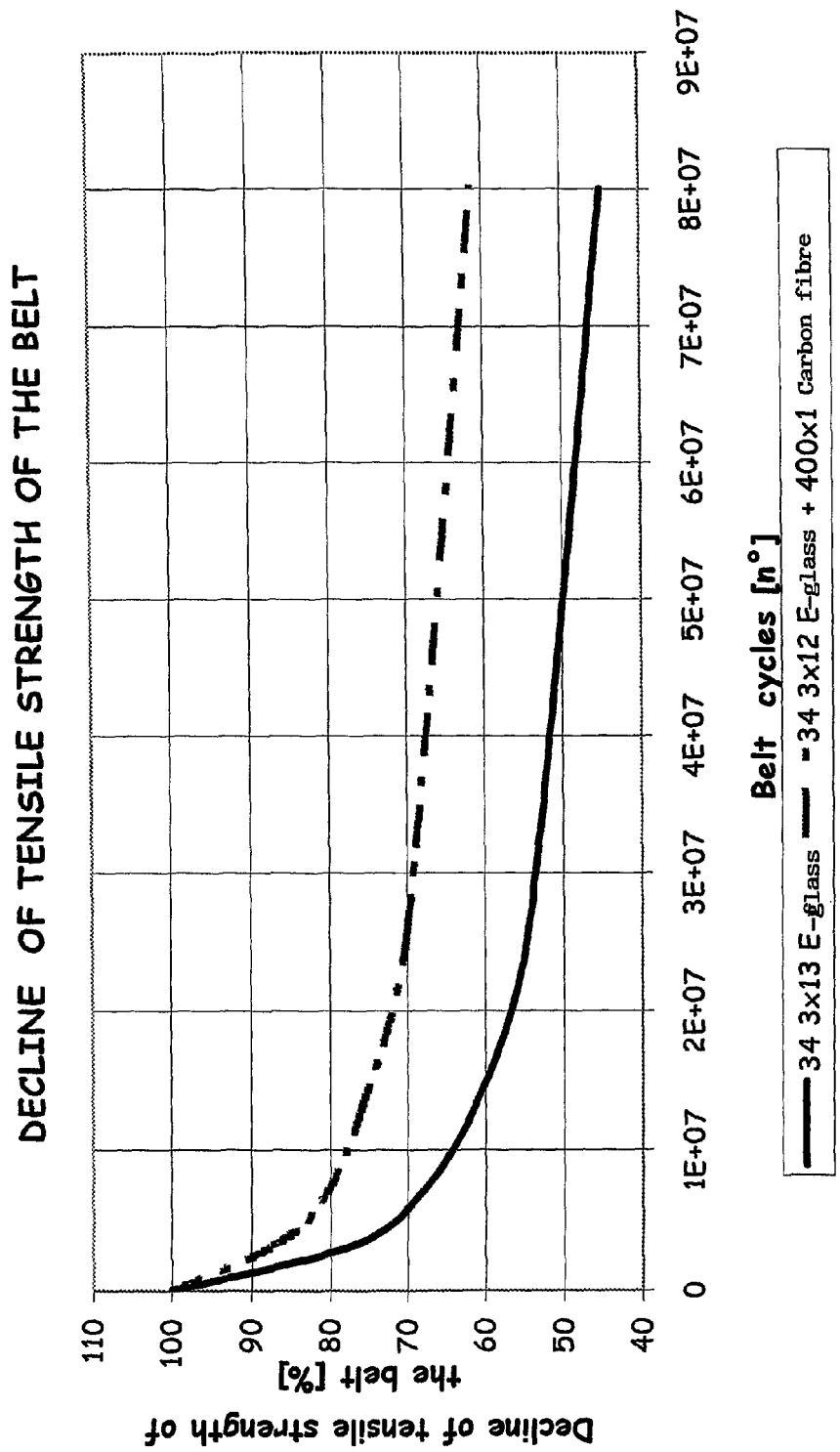
FIG. 6 shows a graph of the values of decline in tensile strength of a belt according to the present invention compared with a belt produced according to the known art.

In particular, using a resistant insert according to the present invention rather than a resistant insert having the same construction, but made entirely of glass, considerable improvements were obtained in terms of decline in tensile strength, as shown in FIG. 6. The graph in FIG. 6 in fact indicates a reduced decline for the entire lifespan of the toothed belt, in the case in which a resistant insert according to the present invention was used.

By examining the properties of the toothed belt 1 produced according to the present invention, the advantages made possible by its use are evident.

In particular, the use of resistant inserts in a belt for use with oil makes it possible to produce narrower belts which are able to function in direct contact with oil and therefore to replace chains and gears without varying the dimensions of the control system.

Moreover, it has been verified experimentally that the combination of the use of resistant inserts produced in two different materials in combination with the use of a resistant layer 8 on the fabric 5, which comprises a fluorinated plastomer and an elastomer and wherein the fluorinated plastomer is present in a greater amount than said first elastomeric material, makes it possible to obtain excellent results and therefore to overcome the problems of prior art toothed belts when used with oil and, in particular, makes it possible to prevent a decrease in the mechanical properties, decreased adhesion, poorer meshing and decreased resistance to wear.

The toothed belt according to the present invention shall now be described also by means of examples without however limitation to these examples.

EXAMPLE 1

Table 2 indicates the properties of a fluorinated plastomer usable in a resistant layer 8.

TABLE 2

| ZONYL MP 1500 | |
|---|---|
| Average density ASTM D 1457 | 350-400 g/l |
| Melting point ASTM D 1457 | 325 ± 10° C. |
| Distribution of particle size (Laser Microtac) | Average 6 μm |
| Specific surface area (Nitrogen absorption) | 11 |

EXAMPLE 2

Table 3 indicates the properties of an elastomeric material in a resistant layer 8.

TABLE 3

| ZETPOL 1010 | |
|---|---|
| Bound acrylonitrile weight % | 44% |
| Mooney viscosity MS 1 + 4 ml 100° C. | 78-92 |
| Specific gravity | 0.98 (g/cm$^3$) |

EXAMPLE 3

Table 4 indicates the chemical composition of a resistant layer 8 produced according to the present invention. This resistant layer has a thickness of 0.250 mm.

TABLE 4

| | |
|---|---|
| Elastomeric material as in example 2 | 100 phr |
| Fluoropolymer-based additive as in Example 1 | 125 phr |
| Peroxide | 6 phr |

The invention claimed is:

1. A method of providing a toothed belt for use in oil, the method comprising:
   providing a toothed belt adapted for use in substantially continuous contact with oil or partially immersed in oil, said belt comprising
   a body,
   a plurality of teeth extending from at least a first surface of said body, said teeth being coated by a first fabric, said first fabric is externally coated by a first resistant layer, which comprises a fluorinated plastomer, a first elastomeric material, and a vulcanizing agent; and in that said fluorinated plastomer is present in said first resistant layer in an amount greater than said first elastomeric material, and
   a plurality of resistant inserts;
   wherein said resistant inserts comprise twisted yarns produced from fibers of at least a first and a second material and said first fibrous material entirely surrounds said second fibrous material;

said first and second materials are chosen from the group consisting of glass fibers, aramid fibers, polyester fibers, PBO fibers, and carbon fibers;

wherein the twisted yarns form an insert of said resistant inserts with dimensions between 0.7 and 1.4 mm, said body comprising as main elastomeric material a copolymer formed from a diene and from a monomer containing nitrile groups in a percentage between 33 and 49 weight percent with respect to the final copolymer.

2. The method of claim 1, wherein said first material has a lower modulus with respect to said second material.

3. The method of claim 1, wherein, in section, said second material occupies a sectional surface between about 15% and about 75% of a total sectional surface of the body.

4. The method of claim 3, wherein, in section, said second material occupies a sectional surface between about 35% and 45% of a total sectional surface of the body.

5. The method of claim 1, characterized in that said resistant inserts include two twists in the same direction.

6. The method of claim 1, wherein said resistant inserts have been treated with an RFL comprising an oil resistant latex.

7. The method of claim 6, wherein said latex comprises an elastomeric material formed from a copolymer obtained from a diene monomer and a monomer containing nitrile groups.

8. The method of claim 7, wherein said copolymer of said latex is formed from a diene and from a monomer containing nitrile groups in a percentage between 33 and 49 weight % with respect to the final copolymer.

9. The method of claim 8, wherein said copolymer of said latex is formed from a diene and from a monomer containing nitrile groups in a percentage of 39 weight %.

10. The method of claim 1, wherein said body comprises a mixture based on a second elastomeric material fanned from a copolymer obtained from a diene monomer and a monomer containing nitrile groups.

11. The method of claim 1, wherein said first resistant layer comprises said fluorinated plastomer in an amount in weight between 101 and 150 parts in weight with respect to said first elastomeric material.

12. The method of claim 1, wherein said fluorinated elastomer is polytetrafluoroethylene.

13. The method of claim 1, wherein a back of said belt is covered by a second fabric.

14. The method of claim 13, wherein said second fabric is externally coated by a second resistant layer.

15. The method of claim 14, wherein said second resistant layer is formed the same as said first resistant layer.

16. The method of claim 1, wherein said first elastomeric material comprises fibers.

17. The method of claim 16, wherein said fibers are present in an amount in weight between 0.5 and 15% with respect to said first elastomeric material.

18. The method of claim 1, wherein said toothed belt comprises, between the toothing and a back surface of said belt, sides treated with a polymer resistant to swelling.

19. Timing control system for a motor vehicle comprising at least one driving pulley, one driven pulley, a toothed belt adapted for use substantially continuous contact with oil or partly immersed in oil, and materials for maintaining said toothed belt in an oil-wet condition; said toothed belt comprising a body, and one or more teeth extending from at least a first surface of said body, said teeth being covered by a first fabric, said first fabric is externally coated by a first resistant layer, which comprises a fluorinated plastomer, a first elastomeric material, and a vulcanizing agent; and in that said fluorinated plastomer is present in said first resistant layer in an amount greater than said first elastomeric material, and a plurality of resistant inserts, wherein said resistant inserts comprise twisted yarns produced from fibers of at least a first and a second material and said first fibrous material entirely surrounds said second fibrous material; said first and second materials are chosen from the group consisting of glass fibers, aramid fibers, polyester fibers, PBO fibers, and carbon fibers; wherein the twisted yarns form an insert of said resistant inserts with dimensions between 0.7 and 1.4 mm, said body comprising as main elastomeric material a copolymer formed from a diene and from a monomer containing nitrile groups in a percentage between 33 and 49 weight percent with respect to the final copolymer.

20. Control system as claimed in claim 19, wherein said first material has a lower modulus with respect to said second material.

21. Control system as claimed in claim 19, wherein, in cross-section, said second material occupies a surface between about 15% and about 75% of a total sectional surface of the body.

22. Control system as claimed in claim 21, wherein, in cross-section, said second material occupies a surface between about 35% and 45% of a total sectional surface of the body.

23. Control system as claimed in claim 19, wherein said resistant inserts include two twists in the same direction.

24. Control system as claimed in claim 19, wherein said resistant inserts have been treated with an RFL comprising an oil resistant latex.

25. Control system as claimed in claim 24, wherein said latex comprises an elastomeric material formed from a copolymer obtained from a diene monomer and a monomer containing nitrile groups.

26. Control system as claimed in claim 25, wherein said copolymer of said latex is formed from a diene and from a monomer containing nitrile groups in a percentage between 33 and 49 weight % with respect to the final copolymer.

27. Control system as claimed in claim 26, wherein said copolymer of said latex is formed from a diene and from a monomer containing nitrile groups in a percentage of 39 weight %.

28. Control system as claimed in claim 19, wherein said body comprises a mixture based on a second elastomeric material formed from a copolymer obtained from a diene monomer and a monomer containing nitrile groups.

29. Control system as claimed in claim 19, wherein said first resistant layer comprises said fluorinated plastomer in an amount in weight between 101 and 150 parts in weight with respect to said first elastomeric material.

30. Control system as claimed in claim 19, wherein said fluorinated plastomer is polytetrafluoroethylene.

31. Control system as claimed in claim 19, wherein a back of said belt is covered by a second fabric.

32. Control system as claimed in claim 31, wherein said second fabric is externally coated by a second resistant layer.

33. Control system as claimed in claim 32, wherein said second resistant layer is formed the same as said first resistant layer.

34. Control system as claimed in claim 19, wherein said first elastomeric material comprises fibers.

35. Control system as claimed in claim 34, wherein said fibers are present in an amount in weight between 0.5 and 15% with respect to said first elastomeric material.

36. Control system as claimed in claim 19, wherein said toothed belt comprises, between the toothing and a back surface of said belt, sides treated with a polymer resistant to swelling.

37. Control system as claimed in claim 36, wherein the control system comprises a pad tensioner pad.

38. A toothed belt, adapted for use in substantially continuous contact with oil or partly immersed in oil, the belt comprising a body, a plurality of teeth extending from at least a first surface of said body, said teeth being coated by a first fabric, said first fabric is externally coated by a first resistant layer, which comprises a fluorinated plastomer, a first elastomeric material, and a vulcanizing agent; and in that said fluorinated plastomer is present in said first resistant layer in an amount greater than said first elastomeric material, and a plurality of resistant inserts, wherein said resistant inserts comprise twisted yarns produced from fibers of at least a first and a second material and said first fibrous material entirely surrounds said second fibrous material; said first and second materials are chosen from the group consisting of glass fibers, aramid fibers, polyester fibers, PBO fibers, and carbon fibers; wherein the twisted yarns form an insert of said resistant inserts with dimensions between 0.7 and 1.4 mm said body comprising as main elastomeric material a copolymer formed from a diene and from a monomer containing nitrile groups in a percentage between 33 and 49 weight percent with respect to the final copolymer.

39. The toothed belt as claimed in claim 38, wherein said first material has a lower modulus with respect to said second material.

40. The toothed belt as claimed in claim 38, wherein, in section, said second material occupies a sectional surface between about 15% and about 75% of a total sectional surface of the body.

41. The toothed belt as claimed in claim 40, wherein, in section, said second material occupies a sectional surface between about 35% and 45% of a total sectional surface of the body.

42. The toothed belt as claimed in claim 38, wherein said resistant inserts have two twists in the same direction.

43. The toothed belt as claimed in claim 38, wherein said resistant inserts have been treated with an RFL comprising an oil resistant latex.

44. The toothed belt as claimed in claim 43, wherein said latex comprises an elastomeric material formed from a copolymer obtained from a diem monomer and a monomer containing nitrile groups.

45. The toothed belt as claimed in claim 44, wherein said copolymer of said latex is formed from a diene and from a monomer containing nitrile groups in a percentage between 33 and 49 weight % with respect to the final copolymer.

46. The toothed belt as claimed in claim 45, wherein said copolymer of said latex is formed from a diene and from a monomer containing nitrile groups in a percentage of 39 weight %.

47. The toothed belt as claimed in claim 38, wherein said body comprises a mixture based on a second elastomeric material formed from a copolymer obtained from a diene monomer and a monomer containing nitrile groups.

48. The toothed belt as claimed in claim 38, wherein said first resistant layer comprises said fluorinated plastomer in an amount in weight between 101 and 150 parts in weight with respect to said elastomeric material.

49. The toothed belt as claimed claim 38, wherein said fluorinated plastomer is polytetrafluoroethylene.

50. The toothed belt as claimed in claim 38, wherein a back of said belt is covered by a second fabric.

51. The toothed belt as claimed in claim 50, wherein said second fabric externally coated by a second resistant layer.

52. The toothed belt as claimed in claim 51, wherein said second resistant layer is formed the same as said first resistant layer.

53. The toothed belt as claimed in claim 38, wherein said first elastomeric material comprises fibres.

54. The toothed belt as claimed in claim 38, wherein said toothed belt comprises, between the toothing and a back surface of said belt, sides treated with a polymer resistant to swelling.

55. The toothed belt as claimed in claim 38 wherein the toothed belt is configured to replace a chain in a timing control system without any dimensional variations being made to the timing control system.

56. A method of providing a belt for use with oil, the method comprising:
providing an oil-wet environment,
providing a toothed belt to operate in said oil-wet environment, said belt comprising:
a body,
a plurality of teeth extending from at leas a first, surface of said body, said teeth being coated by a first fabric, said fabric, said first fabric is externally coated by a first resistant layer, which comprises a fluorinated plastomer, a first elastomeric material, and a vulcanizing agent; and in that said fluorinated plastomer is present in said first resistant layer in an amount greater than said first elastomeric material, and
a plurality of resistant inserts;
wherein said resistant inserts comprise twisted yarns produced from fibers of at least a first and a second material and said first fibrous material entirely surrounds said second fibrous material;
said first and second materials are chosen from the group consisting of glass fibers, aramid fibers, polyester fibers, PBO fibers, and, carbon fibers;
wherein the twisted yarns form an insert of said resistant inserts with dimensions between 0.7 and 1.4 mm;
said body comprising as main elastomeric material a copolymer formed from a diene and from a monomer containing nitrile groups in a percentage between 33 and 49 weight percent with respect to the final copolymer.

57. The method of claim 56 wherein the oil wet environment further comprises an oil spray.

58. The method of claim 56 wherein the oil wet environment further comprises an oil bath.

59. The method of claim 56 wherein the oil-wet environment is provided by an oil transport system configured to deliver oil at approximately 5.8 gallons/hour.

60. The method of claim 56 wherein the oil wet environment provides oil at a temperature of approximately 284° F.

61. The method of claim 56 wherein said first material has a lower modulus with respect to said second material.

62. The method of claim 56, wherein, in cross-section, said second material occupies a sectional surface between about 15% and about 75% of the total sectional surface of the body.

63. The method of claim 62, wherein, in cross-section, said second material occupies a sectional surface between about 35% and about 45% of the total sectional surface of the body.

64. The method of claim 56, characterized in that said resistant inserts include two twists in the same direction.

65. The method of claim 56, wherein said resistant inserts have been treated with an RFL comprising an oil resistant latex.

66. The method of claim 65, wherein said latex comprises an elastomeric material formed from a copolymer obtained from a diene monomer and a monomer containing nitrile groups.

67. The method of claim 66, wherein said copolymer of said latex is formed from a diene and from a monomer containing nitrile groups in a percentage between 33 and 49 weight % with respect to the final copolymer.

68. The method of claim 67, wherein said copolymer of said latex is formed from a diene and from a monomer containing nitrile groups in a percentage of 39 weight %.

69. The method of claim 56, wherein said body comprises a mixture based on a second elastomeric material formed from a copolymer obtained from a diene monomer and a monomer containing nitrile groups.

70. The method of claim 56, wherein said first resistant layer comprises said fluorinated plastomer in an amount in weight between 101 and 150 parts in weight with respect to said first elastomeric material.

71. The method of claim 56, wherein said fluorinated plastomer is polytetrafluoroethylene.

72. The method of claim 56, wherein the back of said belt is covered by a second fabric.

73. The method of claim 72, wherein said second fabric is externally coated by a second resistant layer.

74. The method of claim 73, wherein said second resistant layer is formed the same as said first resistant layer.

75. The method of claim 56, wherein said first elastomeric material comprises fibers.

76. The method of claim 75, wherein said fibers are present in an amount in weight between 0.5 and 15% with respect to said first elastomeric material.

\* \* \* \* \*